INVENTOR.
Peter M. Kobrehel
BY
E. J. Biskup
ATTORNEY

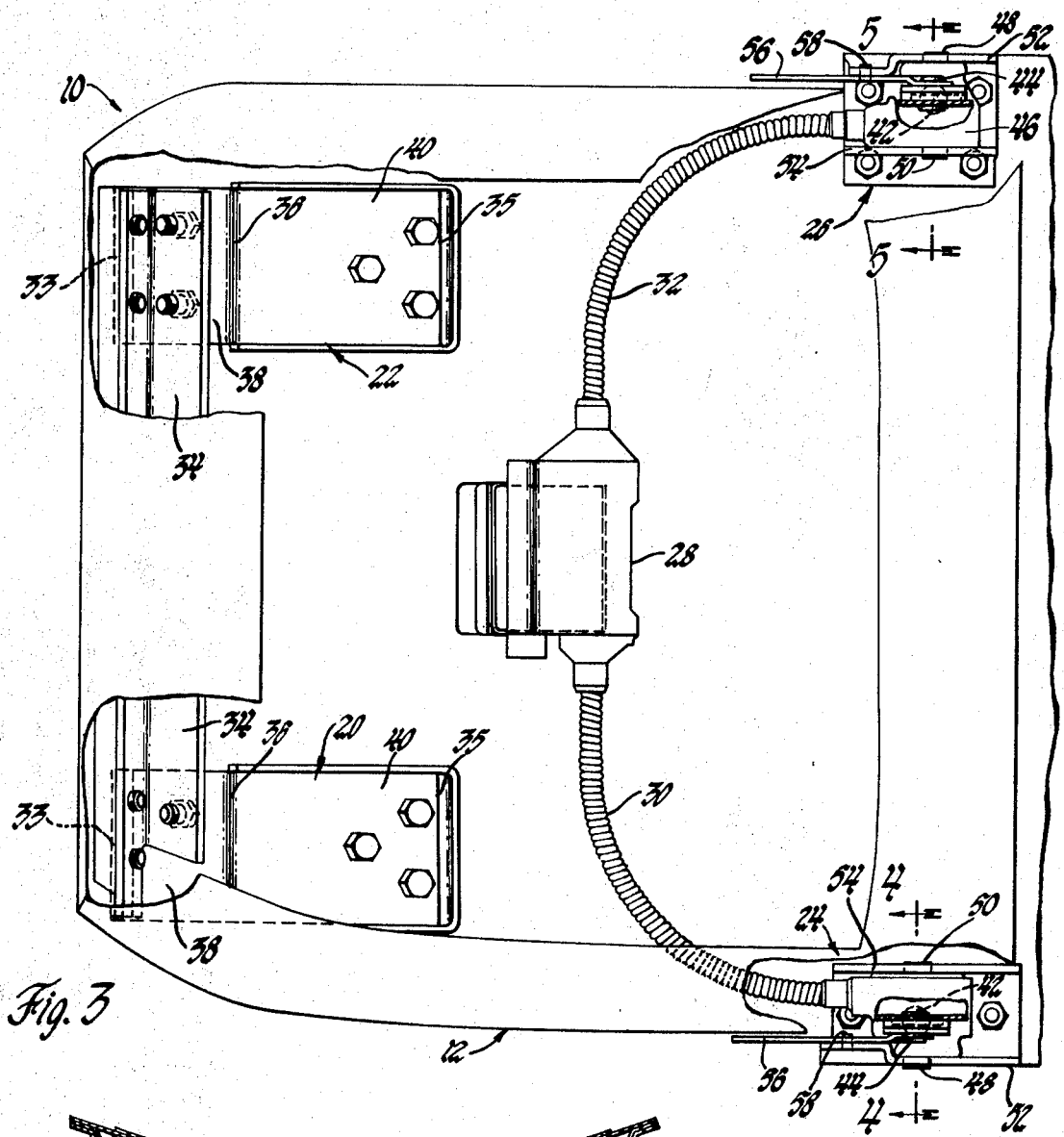
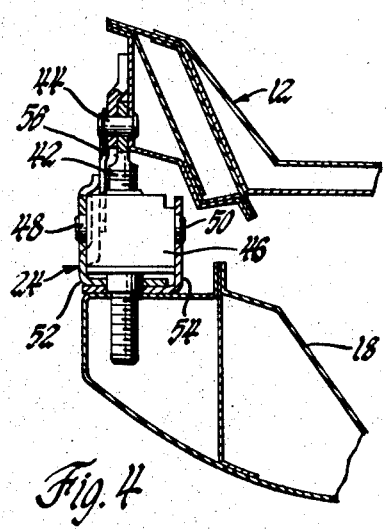
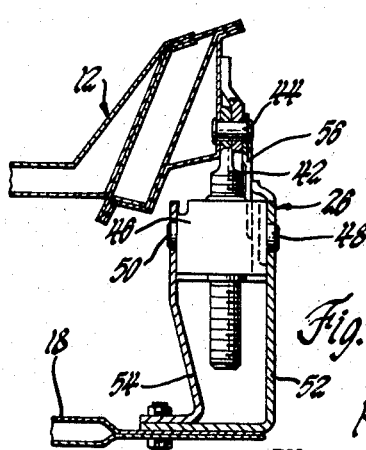

United States Patent Office 3,537,674
Patented Nov. 3, 1970

3,537,674
ADJUSTABLE VEHICLE SEAT
Peter M. Kobrehel, Warren, Mich., assignor to General Motors Corporation, Detroit, Mich., a corporation of Delaware
Filed Nov. 6, 1967, Ser. No. 680,838
Int. Cl. B60n 1/02
U.S. Cl. 248—372                            2 Claims

ABSTRACT OF THE DISCLOSURE

An adjustable vehicle seat characterized in that it has a leaf spring that connects the forward end of the seat to a base support and serves as a counterbalance to ease the movement of the seat during vertical adjustment.

---

The use of counterbalance springs in vehicle seat adjusters to provide ease of movement during vertical adjustment is not new. For example, U.S. Pat. No. 3,137,473, in the name of Algis Augunus, entitled "Vehicle Seat Adjuster" and assigned to the assignee of the present invention, shows a typical manner of employing such springs wherein the latter are located between the seat frame and the vehicle floor and serve to continuously urge the seat upwardly. As exemplified by that disclosure, however, such springs have merely been used for the singular purpose of exerting an upward force on the seat and additional structure in the form of control arms, links, and the like have been required to be connected to the seat for controlling and guiding it as it moves between adjusted positions. As a result, seat adjuster constructions of this type have been unduly complicated in design, and expensive to manufacture and assemble.

Accordingly, the objects of the present invention are to provide a vehicle seat adjuster having a spring that serves the dual function of connecting the seat to a base structure and also acts as a counterbalance; to provide a vehicle seat having a preloaded spring that supports one end of the seat and urges the other end of the seat upwardly; to provide an adjustable seat having a leaf spring that serves as a counterbalance means so as to decrease the amount of force required for upward movement of the seat; to provide a vehicle seat having the rear end thereof vertically adjustable with the forward end of the seat being hinged to a suitable base support by a spring member; and to provide a counterbalance spring for a vehicle seat that serves as a hinge for supporting one part of the seat while another part thereof is adjusted in position.

Other objects and advantages of the present invention will be apparent from the following detailed description when taken with the drawings in which:

FIG. 3 is a plan view of the seat construction shown in FIGS. 1 and 2;

FIG. 4 is an enlarged sectional view taken on line 4—4 of FIG. 3, and

FIG. 5 is a view taken on line 5—5 of FIG. 3.

Figure 1:
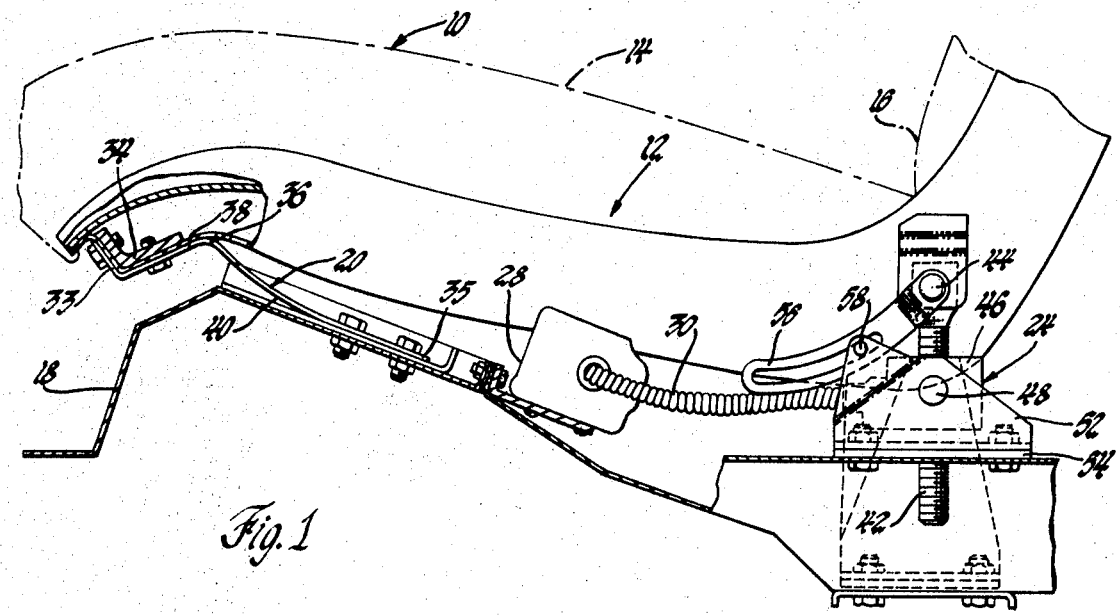
FIG. 1 is an elevation view showing an adjustable vehicle seat made in accordance with the invention.

Referring to the drawings and more particularly FIGS. 1 and 3 thereof, a vehicle seat 10 of the bucket type is shown having a frame 12 consisting of a contoured sheet metal base that serves to support the usual seat and back cushions 14 and 16, respectively, as indicated by the phantom lines. The forward end of the seat frame 12 is connected to the floor or base structure 18 of the vehicle by a pair of transversely spaced leaf springs 20 and 22, while the rear of the seat frame 12 at each corner thereof is connected with adjustable screw jack devices 24 and 26 that are simultaneously operated by a centrally located reversible motor 28 through flexible drive shafts 30 and reversible electric motor 28 through flexible drive shafts 30 and 32. The arrangement is such that by operation of the screw jack devices 24 and 26, the rear of the seat 10 is movable between the lowered position shown in FIG. 1 and a raised position shown in FIG. 2 so as to adjust the seating height of the seat.

Figure 2:
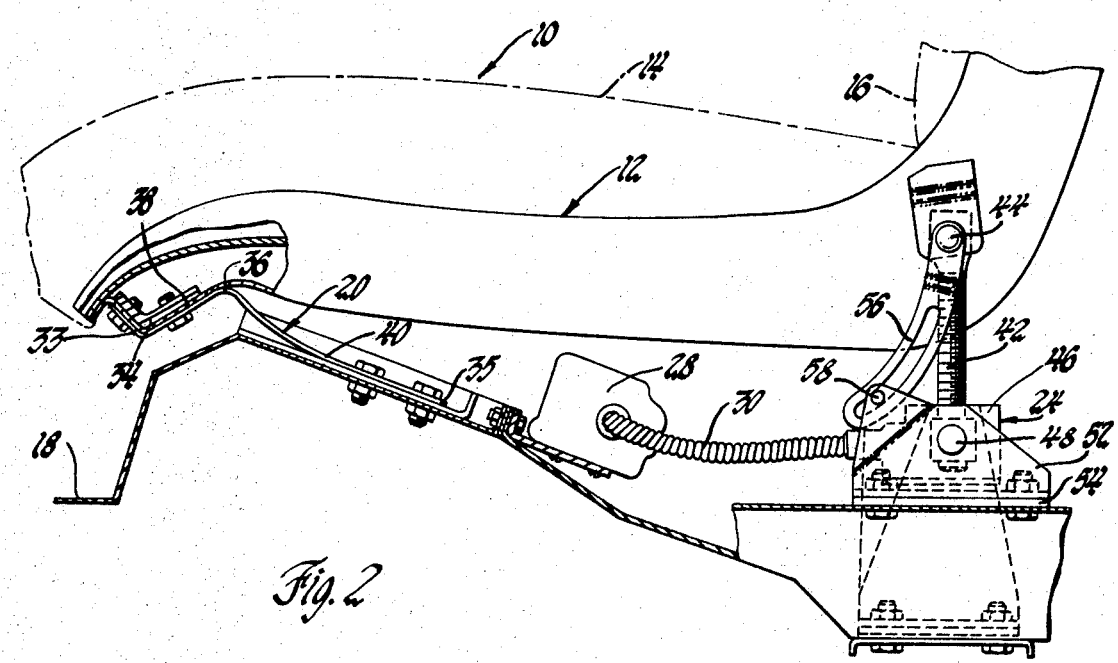
FIG. 2 is similar to FIG. 1 but shows the seat in the raised position.

More specifically, each of the leaf springs 20 and 22 is bolted adjacent to its forward edge 33 to a cross bar 34 which forms a rigid part of the seat frame 12, while the rear portion of the spring adjacent to the rear edge 35 is bolted to the vehicle floor 18. Intermediate the points of attachment, each spring has a bent portion 36 which in the relaxed state or prior to assembly spaces the arms 38 and 40 of the spring by an angle of approximately 90°. It will be noted that, as shown in FIGS. 1 and 2 of the drawings, the angle between the aforementioned arms of the spring is greater than 90° so as to place the spring in a preloaded condition, and thus permit it to exert downward force on the front end of the seat 10 with a resultant upward force being applied at the rear of the seat. By so doing, the spring not only acts as a hinge between the seat 10 and vehicle floor 18, but also as a counterbalance means for assisting the raising of the seat in cooperation with the screw jack devices 24 and 26.

As shown in FIGS. 4 and 5, each of the screw jack devices 24 and 26 includes a screw shaft 42, the upper end of which is pivotally connected to the seat frame by a pivotal connection 44. A portion of the screw shaft 42 is located within a housing 46 having the usual worm gear drive which permits vertical movement of the screw shaft upon energization of the electric motor 28. The housing 46 includes trunnions 48 and 50 which are pivotally supported within angle iron brackets 52 and 54, the lower ends of which are rigid with each other and fixed to the vehicle floor 18. Screw jack devices of this sort as well as the drive means therefor are conventional and well known to those skilled in the art and, therefore, a further detailed discussion of these devices is not deemed to be necessary.

With reference to FIGS. 1 and 2 of the drawings, operation of the above-described seat construction is as follows: As shown in FIG. 1, the seat 10 is in the lowered position and when it is desired to raise the seat, the occupant will simply move a suitable switch device in the proper direction and thereby energize the electric motor 28 causing the screw jack devices 24 and 26 to be activated. As a result, the screw shafts 42 will progressively extend out of the housing 46 causing vertical movement of the rear of the seat. As alluded to hereinbefore, the leaf springs 20 and 22 located at the front of the seat 10 serve as hinge members as well as counterbalance means so as to facilitate the vertical movement of the seat. When the seat 10 reaches the position of FIG. 2, suitable means incorporated with the electric circuit operating the electric motor 28 can serve to automatically deenergize the motor. As an alternative, a link 56 extending between the pivot connection 44 and a pin 58 located on a support bracket can serve as a stop for limiting both upward and lowering movement of the seat. As should be apparent, upon reverse movement of the electric motor 28, the screw shafts 42 will be retracted by moving into the housing 46 so as to lower the rear of the seat 10 and return it to the original position of FIG. 1.

Various changes and modifications can be made in this construction without departing from the spirit of the invention. Such changes and modifications are contemplated by the inventor and he does not wish to be limited except by the scope of the appended claims.

I claim:
1. A vehicle seat adjuster mechanism for supporting a vehicle seat on a vehicle floor, said mechanism comprising: a V-shaped leaf spring including a pair of integral arms defining a predetermined included angle in a relaxed condition; first and second means respectively mounting one arm on the front end of the seat and mounting the other arm on the floor to assemble said leaf spring thereto and support the front end of said seat on said floor, said V-shaped leaf spring opening toward said floor and said spring being deformed to increase the included angle between said arms upon assembly of said spring to said seat and said floor, the deformation of said spring biasing the rear end of said seat forwardly and upwardly and power operated means mounted on said floor and operatively associated with the rear end of said seat for controlling vertical movement of the rear end of the seat, said power operated means being assisted in raising said seat by the upward biasing of the rear end of the seat by said spring and said power operated means overcoming the upward biasing of the rear end of said seat by said spring in lowering said seat.

2. A vehicle seat adjuster mechanism for supporting a vehicle seat on a vehicle floor, said mechanism comprising: a V-shaped leaf spring including a pair of integral arms positioned generally normal to each other in a relaxed condition; first and second means respectively mounting one arm on the front end of the seat and mounting the other arm on the floor to assemble said leaf spring thereto and support the front end of said seat on said floor, said V-shaped leaf spring opening toward said floor, and said spring being deformed to increase the included angle between said arms to an obtuse angle upon assembly of said spring to said seat and said floor, the deformation of said spring biasing the rear end of said seat forwardly and upwardly; and power operated means mounted on said floor and operatively associated with the rear end of said seat for controlling vertical movement of the rear end of the seat, said power operated means being assisted in raising said seat by the upward biasing of the rear end of the seat by said spring and said power operated means overcoming the upward biasing of the rear end of said seat by said spring in lowering said seat.

References Cited
UNITED STATES PATENTS

| | | | |
|---|---|---|---|
| 70,756 | 11/1867 | Smith | 297—300 |
| 1,441,534 | 1/1923 | McCollough | 297—300 |
| 2,586,951 | 2/1952 | Johnson | 297—286 |
| 2,845,111 | 7/1958 | Barecki | 297—300 |
| 386,142 | 7/1888 | Lewis | 297—328 |
| 2,081,333 | 5/1937 | Hoover | 297—308 |
| 2,321,716 | 6/1943 | Wohlberg | 248—395 |
| 2,699,200 | 1/1955 | Lingle | 297—294 |
| 2,930,428 | 3/1960 | De Rose | 248—394 |
| 3,033,510 | 5/1962 | Hollar | 248—394 |
| 3,091,426 | 5/1963 | Bogart | 248—393 |
| 3,182,947 | 5/1965 | Tanaka | 248—396 |
| 3,222,025 | 12/1965 | Pickles | 248—397 |
| 3,291,525 | 12/1966 | Fritzmeier | 297—308 |

FRANCIS K. ZUGEL, Primary Examiner

U.S. Cl. X.R.

248—397; 297—300